(12) United States Patent
Tabuchi et al.

(10) Patent No.: US 6,722,993 B2
(45) Date of Patent: Apr. 20, 2004

(54) POWER TRANSMISSION SYSTEM

(75) Inventors: Yasuo Tabuchi, Toyoake (JP); Manabu Saiki, Chiryu (JP); Naoto Agata, Toyoake (JP); Makoto Ito, Okazaki (JP); Yuichi Aoki, Chita-gun (JP); Junichi Ohguchi, Toyoake (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/072,949

(22) Filed: Feb. 12, 2002

(65) Prior Publication Data

US 2002/0132673 A1 Sep. 19, 2002

(30) Foreign Application Priority Data

Mar. 15, 2001 (JP) ........................................ 2001-074901
Oct. 30, 2001 (JP) ........................................ 2001-332748

(51) Int. Cl.[7] ................. F16D 7/02; F16D 3/68
(52) U.S. Cl. ................ 464/34; 464/89; 474/17
(58) Field of Search ................. 464/73, 74, 76, 464/81, 87, 89, 92, 180, 30, 32, 34; 474/17

(56) References Cited

U.S. PATENT DOCUMENTS

| | | | |
|---|---|---|---|
| 2,326,450 A | * | 8/1943 | Fawick ................. 464/83 |
| 2,989,857 A | * | 6/1961 | Helland et al. .......... 464/32 |
| 3,345,831 A | | 10/1967 | Boole |
| 4,795,402 A | | 1/1989 | Reichardt |
| 6,045,448 A | | 4/2000 | Kern et al. |
| 6,110,061 A | * | 8/2000 | Kishibuchi et al. ........ 474/17 |
| 6,244,964 B1 | * | 6/2001 | Kirschey ................. 464/74 |
| 6,332,842 B1 | * | 12/2001 | Tabuchi et al. ............ 464/33 |

FOREIGN PATENT DOCUMENTS

DE 1575752 1/1970

OTHER PUBLICATIONS

U.S. patent application Ser. No. 09/597,831, Tabuchi et al., filed Jun. 19, 2000.

* cited by examiner

Primary Examiner—Lynne H. Browne
Assistant Examiner—Kenneth Thompson
(74) Attorney, Agent, or Firm—Posz & Bethards, PLC

(57) ABSTRACT

A power transmission system has a Neidhart structure in which a damper is shearing-deformed while being press-deformed when torque is applied to a pulley. The torque is transmitted from the pulley to a center hub by the reaction force in response to a vector component of the deformation of the damper, parallel to the pulley rotation direction, while a torque fluctuation is reduced by the deformation of the damper. Thereby, it is possible to set an elasticity modulus of the damper to be smaller. Therefore, it is possible to provide a compact power transmission system having a reduced torque fluctuation.

10 Claims, 8 Drawing Sheets

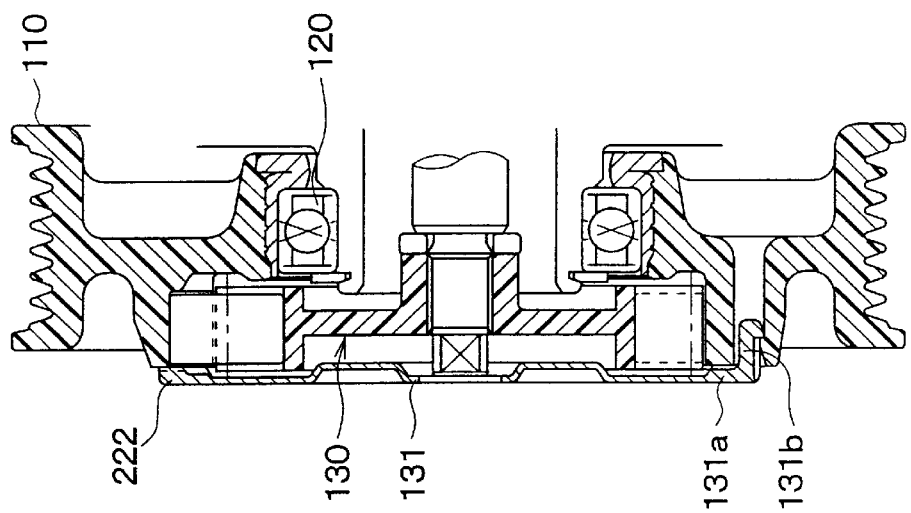
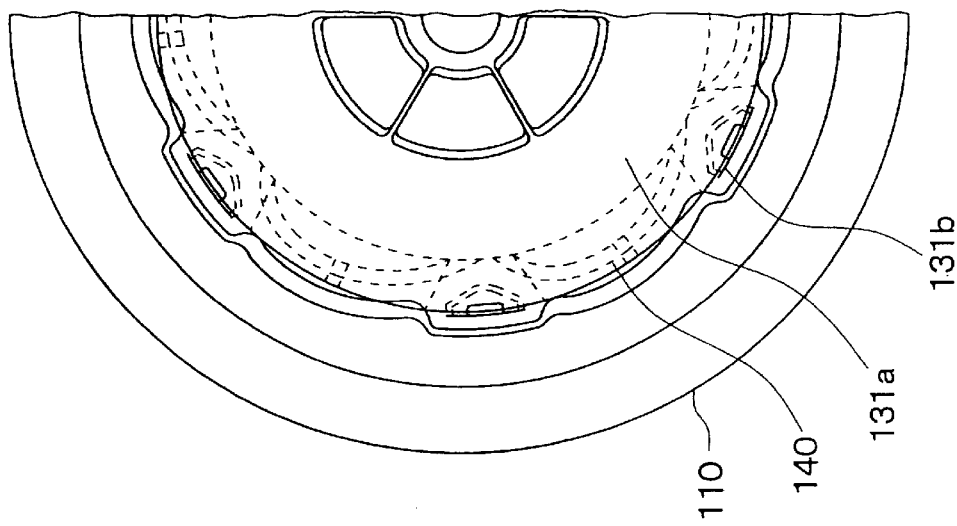

POWER TRANSMISSION SYSTEM

CROSS-REFERENCE TO RELATED APPLICATION

This application is based on and incorporates herein by reference Japanese Patent Applications No. 2001-74901 filed on Mar. 15, 2001, and No. 2001-332748 filed on Oct. 30, 2001.

BACKGROUND OF THE INVENTION

1. Field of the Invention

The present invention relates to a power transmission system that transmits torque generated by a driving unit such as an engine and an electric motor to a driven unit such as a pump and a compressor. The present invention is suitably applied to a power transmission system transmitting a power from an engine to a compressor used for an air conditioning apparatus for a vehicle.

2. Description of Related Art

A power transmission system used for an air conditioning apparatus for a vehicle transmits torque to a compressor from an engine, i.e., a reciprocation-type internal combustion engine. Therefore, the system incurs a larger fluctuation in torque than a system for transmitting power generated by an electrically rotating power source such as an electric motor. However, if a torque-fluctuation reducing member for reducing the torque fluctuation is simply used for the power transmission system, the size of the power transmission system is increased.

SUMMARY OF THE INVENTION

In view of the foregoing problems, it is an object of the present invention to provide a power transmission system having a compact size, which can sufficiently reduce torque fluctuation.

According to the present invention, in a power transmission system for transmitting torque from a driving unit to a driven unit, a first rotating member rotated by the driving unit has a first torque transmitting surface, a second rotating member connected to the driven unit is disposed coaxially with the first rotating member to have a second torque transmitting surface, and an elastically-deformable torque transmitting member is disposed to contact the first and the second torque transmitting surfaces to transmit torque from the first rotating member to the second rotating member. The first and the second torque transmitting surfaces are arranged opposite to each other in a radial direction of the first and the second rotating members, the first torque transmitting surface has a plurality of first concaves (concavities) each of which is recessed toward a side opposite to the second torque transmitting surface, the second torque transmitting surface has a plurality of second concaves (concavities) each of which is recessed toward a side opposite to the first torque transmitting surface, and the torque transmitting member is disposed between the first and the second concaves opposite to each other. Accordingly, when torque is applied to the first rotating member, the first rotating member and the second rotating member are relatively displaced, and the torque transmitting member is shearing-deformed while being press-deformed. Therefore, the torque is transmitted from the first rotating member to the second rotating member by the reaction force in response to a vector component of the deformation of the torque transmitting member, parallel to the rotation direction, and a torque fluctuation can be sufficiently reduced by the compression-deformation and the shearing deformation of the torque transmitting member. As a result, the elasticity modulus of the torque transmitting member can be made smaller, and the size of the power transmitting system can be reduced while the torque fluctuation is reduced.

Preferably, the torque transmitting member is a double-layer structure having an outer layer and an inner layer inside the outer layer, the outer layer is made of a material having a predetermined abrasion resistance and a rigidity higher than the inner layer, and the inner layer is made of a material having a predetermined damping characteristic and a predetermined extensibility. Therefore, durability of the power transmitting member can be improved. Further, the torque transmitting member is provided to have a cross-sectional shape where strain, generated when torque acts on the torque transmitting member, is approximately uniformly distributed along an entire cross-section. Therefore, it can prevent cracks from being generated while the durability of the torque transmitting member can be further improved.

The torque transmitting member is provided to have a cross-sectional shape where a connection portion connecting one side end portions of contact surfaces of the torque transmitting member, contacting the first and second torque transmitting surfaces, becomes approximately straight line, and the one side end portions are provided to form a curved surface. More preferably, a radial outer side of the connection portion is tilted toward a rotation backward side relative to a radial direction of the first and second rotating members, when torque is not applied to the torque transmitting member. Accordingly, it can prevent a contact area between the torque transmitting member and the first and second torque transmitting surfaces from being greatly reduced, and it can prevent a contact surface pressure therebetween from being greatly increased.

BRIEF DESCRIPTION OF THE DRAWINGS

The above and other objects, features and advantages of the present invention will become more apparent from the following detailed description made with reference to the accompanying drawings. In the drawings:

FIG. 6A is a side view of a power transmission system according to the third embodiment, and FIG. 6B is a cross-sectional view of the power transmission system shown in FIG. 6A;

DETAILED DESCRIPTION OF THE PREFERRED EMBODIMENTS

The present invention will be described in detail with reference to various embodiments.

First Embodiment

Figure 1:
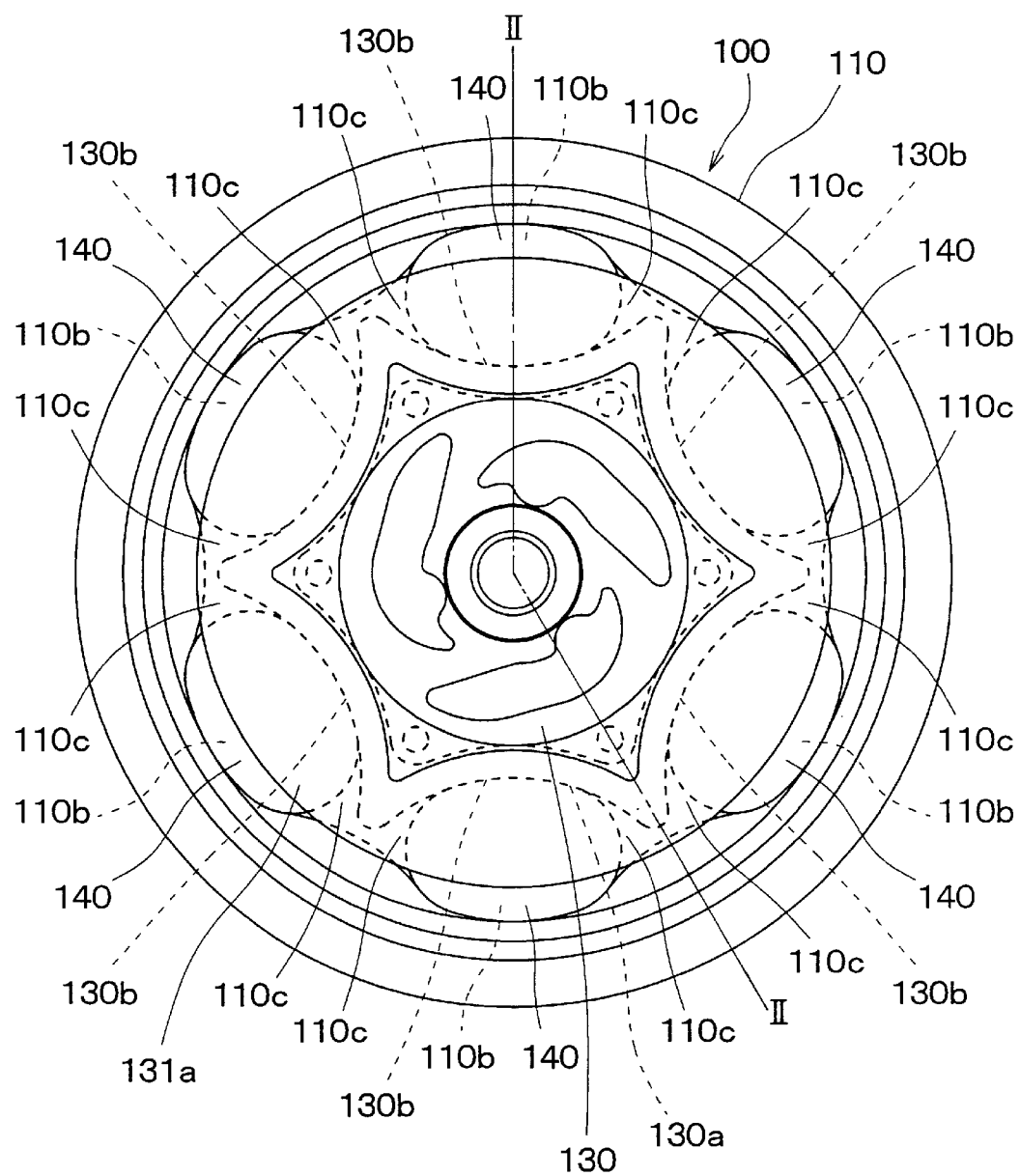
FIG. 1 is a side view of a power transmission system according to a first embodiment of the present invention.
Figure 2:
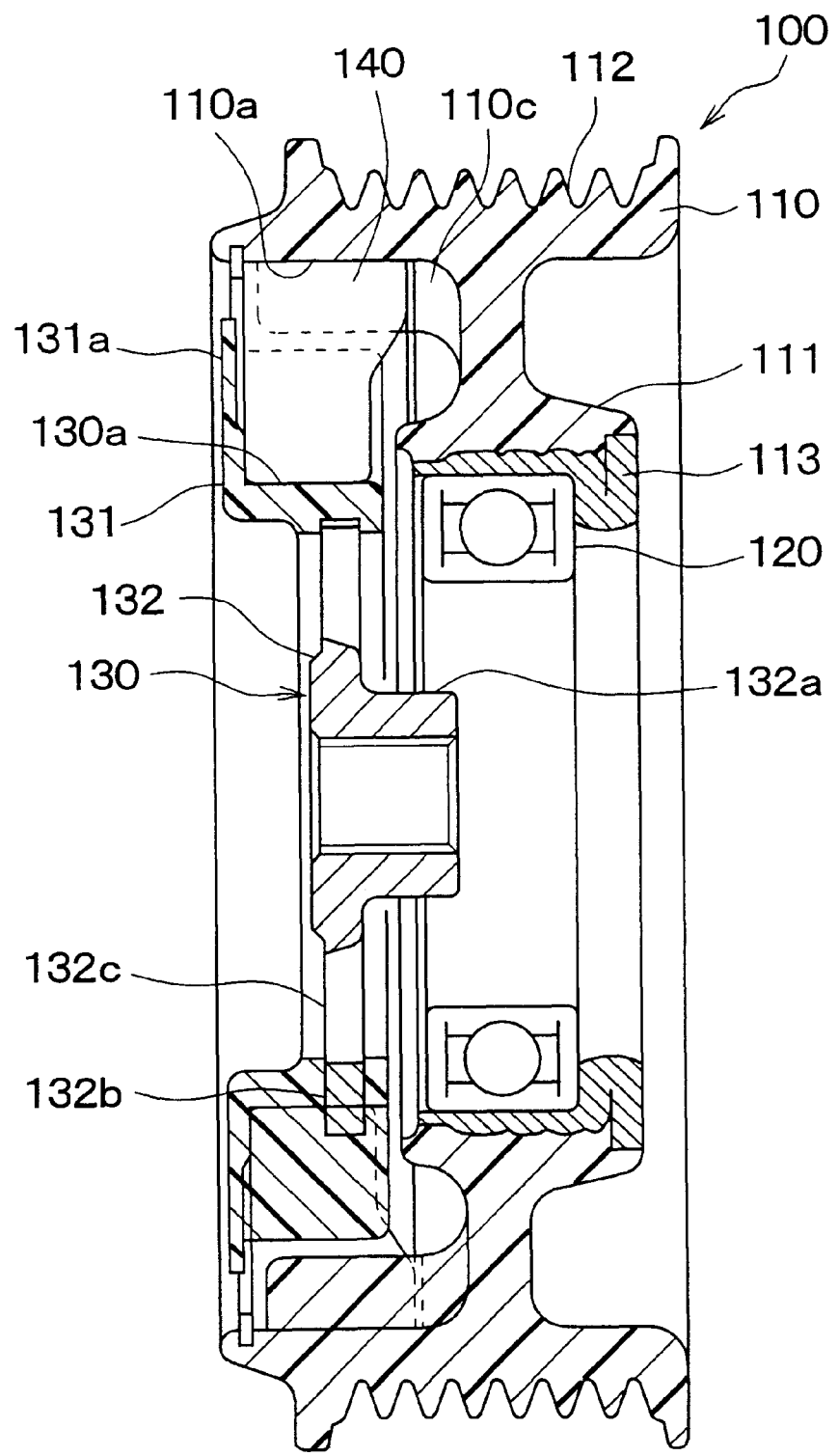
FIG. 2 is a cross-sectional view of the first embodiment taken along the line II—II in FIG. 1.

The structure of a power transmission system 100 in a first embodiment of the present invention will now be described with reference to FIGS. 1 and 2. In FIGS. 1 and 2, a pulley 110 is used as a first rotating member. The pulley 110 is made of metal or hard resin (e.g., phenol resin in this embodiment), and is formed into an approximately cylindrical shape to be rotated by power from an engine through a V-belt (not illustrated). The power from the engine is transmitted to the pulley 110 through the V-belt. Inside the pulley 110, a cylindrical pulley hub 111 is formed integrally with the pulley 110 by molding. A radial-rolling bearing 120 is attached to the pulley hub 111 to rotatably support the pulley 110. An inner part of the radial-rolling bearing 120 is press-fitted to a front housing of a compressor (not illustrated).

Figure 3:
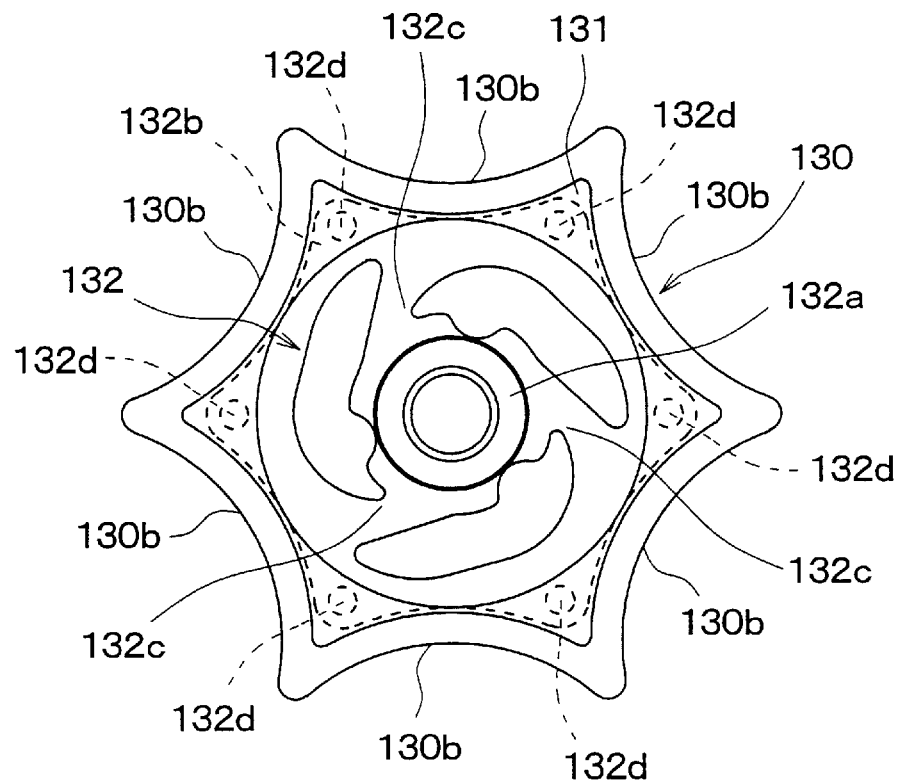
FIG. 3 is a side view of a center hub of the power transmission system according to the first embodiment.

In the first embodiment, the pulley 110 has a plurality of V-shaped grooves 112 for a V-ribbed belt, and is made of resin. A metal sleeve 113, to which the bearing 120 is attached, is integrated with the pulley hub 111 at an inner radial wall thereof by insert molding. A center hub 130 is used as a second rotating member in the power transmission system. The center hub 130 is made of metal and is coaxially disposed inside the pulley 110, as shown in FIG. 1. As shown in FIG. 3, the center hub 130 is formed so as to have a hexagon shape in which each side is warped inward. The center hub 130 includes an outer hub 131 made of a resin having higher rigidity than that of a damper 140 described later, and an inner hub 132 made of a metal. The outer hub 131 is disposed in an outer periphery side of the center hub 130, and the inner hub 132 is integrated with the outer hub 131 by insert molding.

The inner hub 132 includes a cylinder part 132a, a ring part 132b, and plural bridging parts 132c. The cylinder part 132a is formed in a cylindrical shape and is connected to a shaft (not illustrated) of the compressor by spline coupling. The ring part 132b is integrated with the outer hub 131. The bridging parts 132c are disposed to transmit torque from the ring part 132b to the cylinder part 132a by mechanically connecting the ring part 132b and the cylinder part 132a. Each bridging part 132c is set to be broken when the torque transmitted from the ring part 132b to the cylinder part 132a exceeds a predetermined threshold value. In the first embodiment, three bridging part 132c are used, for example.

Plural holes 132d are formed in a part of the ring part 132b, to which the outer hub 131 is disposed, and are used as mechanically engaging means. In addition, the outer periphery of the ring part 132b is formed into a hexagon shape in which each side is warped inward. Thereby, the inner hub 132 is firmly engaged with the outer hub 131, and the inner hub 130 tightly contacts a damper 140. In the first embodiment, each outer periphery side of the center hub 130 and the ring part 132b can be formed into the other polygon shape. For example, the outer periphery side of the ring part 132b can be formed into a star shape or a gear wheel shape.

The pulley 110 has an inner peripheral surface 110a (a first torque transmitting surface) on the inner wall thereof, as shown in FIG. 2. The outer hub 131 has an outer peripheral surface 130a (a second torque transmitting surface) on the outer wall thereof. The inner peripheral surface 110a of the pulley 110 is disposed opposite to the outer peripheral surface 130a of the outer hub 131, a radial direction of the pulley 110 (the inner hub 130).

Specifically, as shown in FIG. 2, the outer peripheral surface 130a of the center hub 130 is opposite to the inner peripheral surface 110a of the pulley 110 in the radial direction to have a predetermined clearance therebetween in the radial direction. As shown in FIG. 1, plural inner concaves (concavities) 110b and the same number of outer concaves (concavities) 130b are formed, respectively, on the inner peripheral surface 110a of the pulley 110 and the outer peripheral surface 130a of the center hub 130. One inner concave 110b of the inner peripheral surface 110a of the pulley 110 and one outer concave 130b of the outer peripheral surface 13a of the center hub 130 are opposite to each other to form a damper-arrangement space, as shown FIG. 1. That is, a damper-arrangement space is defined by a pair of the inner concave 110b and the outer concave 130b opposite to each other in the radial direction. The damper 140 having an elliptic cylinder shape is disposed in the damper-arrangement space between a pair of the inner concave 110b and the outer concave 130b opposite to each other. The damper 140 contacts the inner peripheral surface 110a and the outer peripheral surface 130a to transmit the torque from the pulley 110 to the center hub 130. That is, the damper 140 is used as a torque transmission member. The damper 140 is made of an elastic material such as EPDM (ethylene-propylene-diene ternary polymerization rubber) in the first embodiment. The damper 140 is formed into a cylinder shape extending in a direction parallel to an axial direction of the pulley 110, and has an elliptical sectional shape in a section perpendicular to the axial direction as shown in FIG. 1.

As shown in FIG. 1, a projection 110c (a first axial direction stopper) is provided in the pulley 110 at one end side in the axial direction to protrude toward the damper 140, so that a movement of the damper 140 toward the one end side in the axial direction, more than a predetermined dimension, can be prevented by the projection 110c. In addition, a cover 131a (a second axial direction stopper) is integrated with the outer hub 131 to prevent the damper 140 from moving toward the other end side in the axial direction, more than a predetermined dimension. That is, a movement of the damper 140 in the axial direction of the pulley 110 is regulated by the projection 110c provided in the pulley 110 and the cover 131a formed integrally with the outer hub 131.

Next, the operation of the power transmission system 100 according to the first embodiment will be described. When a torque is applied to the pulley 110, the pulley 110 and the center hub 130 are relatively displaced from each other, and the damper-arrangement space of the damper 140 is reduced. Therefore, the damper 140 accommodated in the damper-arrangement space is shearing-deformed while being compression-deformed. That is, the damper 140 is deformed to have the shearing deformation and the compression deformation. Accordingly, the torque is transmitted from the pulley 110 to the center hub 130 by the reaction force due to a vector component of the deformation of the damper 140, parallel to the pulley rotation direction. Thus, the torque fluctuation is reduced by the shearing deformation and the compression deformation of the damper 140.

If the torque transmitted from the pulley 110 to the center hub 130 exceeds a predetermined value, the bridging part 132c is broken, and the torque transmission from the pulley 110 to the center hub 130 is interrupted. That is, the inner hub 132 functions as a torque limiter that prevents torque larger than the predetermined threshold value from being transmitted.

Next, advantages of the first embodiment will be now described. When the torque is transmitted from the pulley 110 to the center hub 130, the damper 140 is deformed to have the compression deformation and the shearing deformation. In addition, the torque is transmitted by the reaction force in response to the vector component of the deformation (compression deformation and shearing deformation) of the damper 140, which is parallel to the pulley rotation direction. Therefore, the torque fluctuation is damped by the deformation (compression deformation and shearing deformation) of the damper 140. Accordingly, the elasticity modulus of the damper 140 can be set smaller as compared with a case where only the compression deformation is mainly generated. Thus, the torque fluctuation can be sufficiently reduced without enlarging the size of the power transmission system 100.

The elasticity modulus of the damper 140 is defined as a ratio K ($\Delta T/\Delta \theta$) of a changed amount of the torque T transmitted from the pulley 110 to the center hub 130, to a changed amount of a relative rotation angle $\theta$ of the pulley 110 against the center hub 130.

The damper 140 is formed into a simple cylinder shape having an elliptic cross-section. Therefore, the damper 140 is readily manufactured at low cost, and the production cost of the power transmission system 100 can be reduced.

The number of the dampers 140 provided in the system 100 is set to be a natural-number times the number of the bridging parts 132c. For example, in the first embodiment, the number of the dampers 140 is set to be twice the number of the bridging parts 132c. Therefore, the torque can be approximately uniformly distributed to each of the dampers 140, and it can prevent non-uniform loads from being applied to the dampers 140 and the bridging parts 132. Accordingly, durability of the power transmission system 100 can be improved, and it can prevent the torque limiting function of the inner hub 132 from be incorrectly operated.

Second Embodiment

The second embodiment of the present invention will be now described with reference to FIG. 4. The second embodiment is different from the first embodiment mainly in the arrangement position of the damper 140. As shown in FIG. 2, in the above-described first embodiment, the position of the damper 140 is offset from the bearing 120 in the axial direction of the power transmission system 100.

Figure 4:
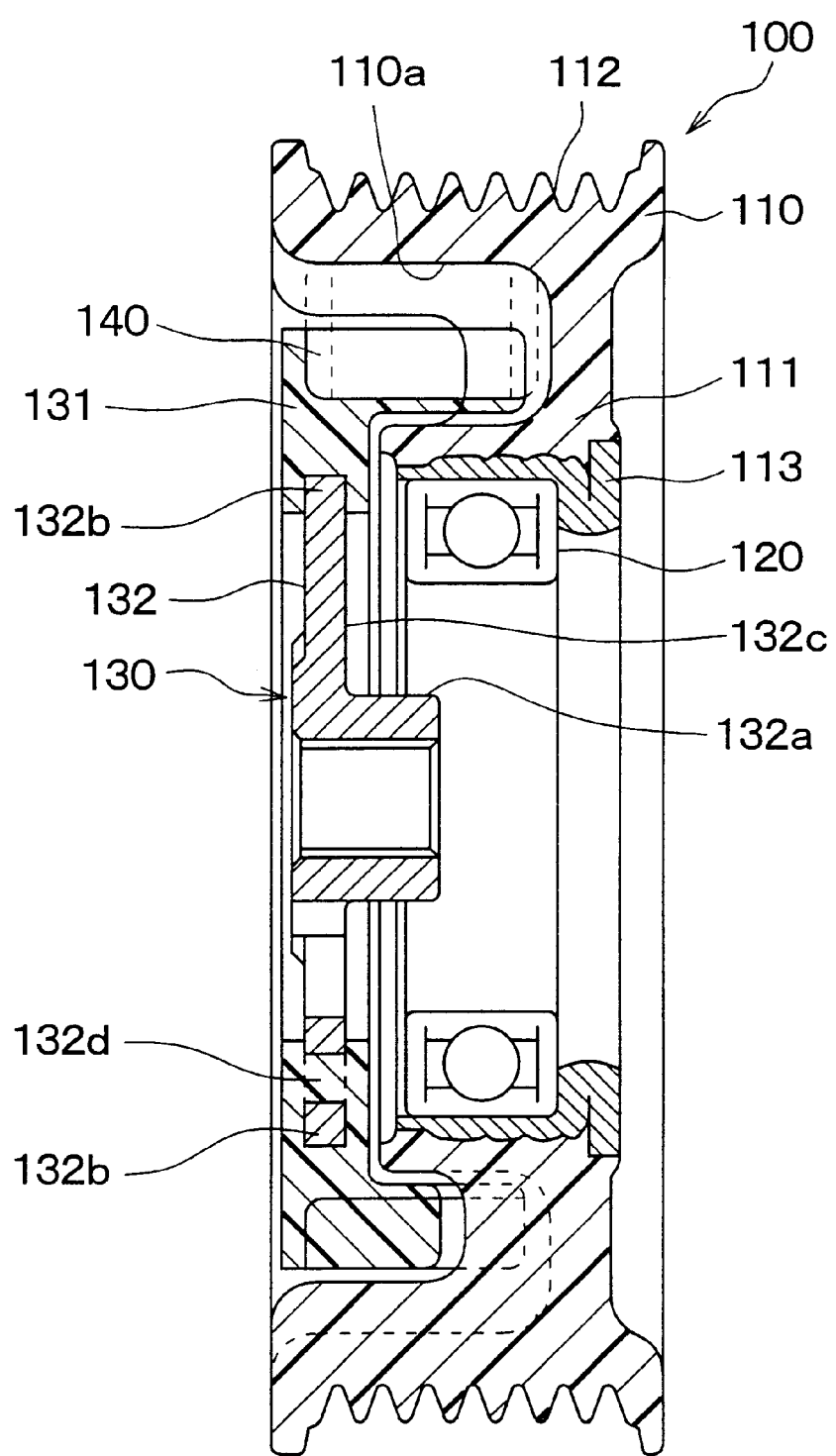
FIG. 4 is a cross-sectional view of a power transmission system according to a second embodiment of the present invention.

However, in the second embodiment of the present invention, as shown in FIG. 4, the damper 140 is disposed at a direct radial outside of the bearing 120 in order to reduce the size of the power transmission system 100 in the axial direction. In the second embodiment, the other parts are similar to those of the above-described first embodiment.

Third Embodiment

Figure 5A:
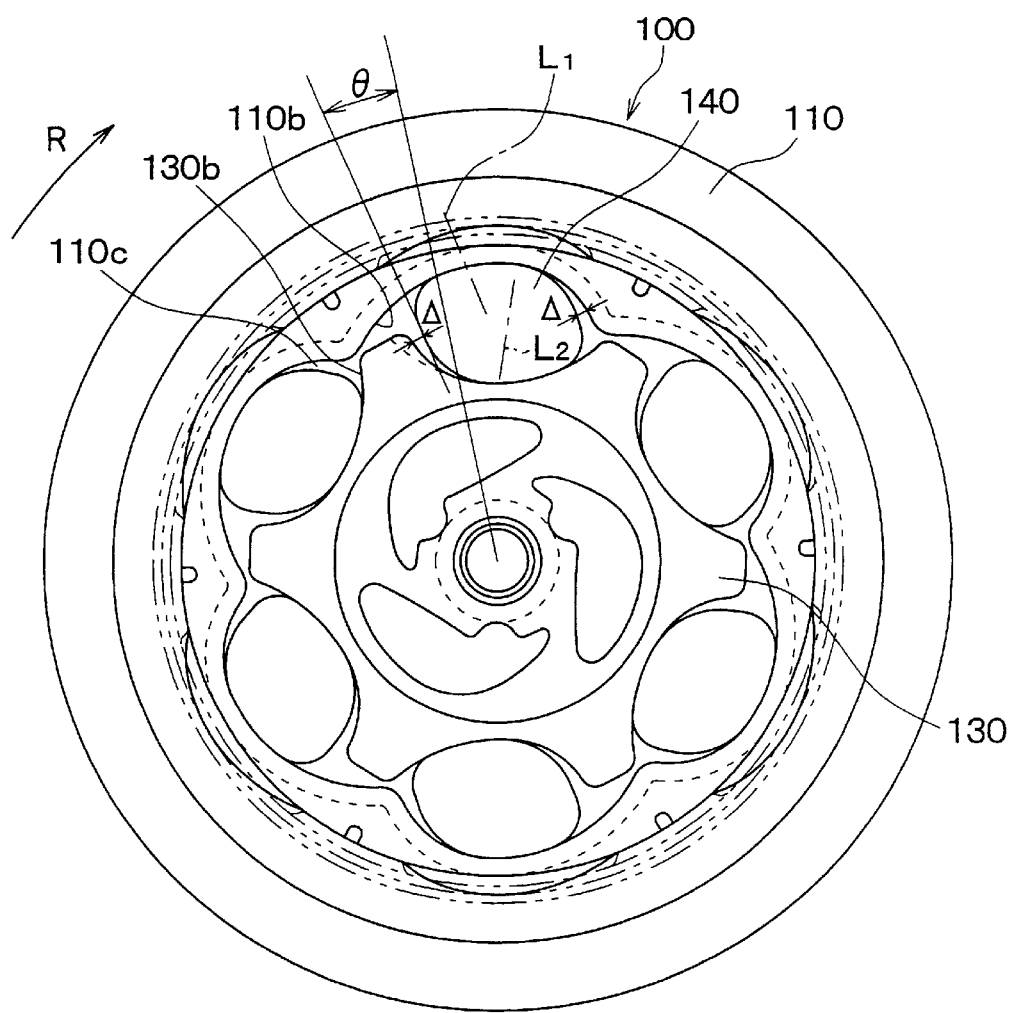
FIG. 5A is a side view of a power transmission system according to a third embodiment of the present invention.
Figures 5B, 5C:
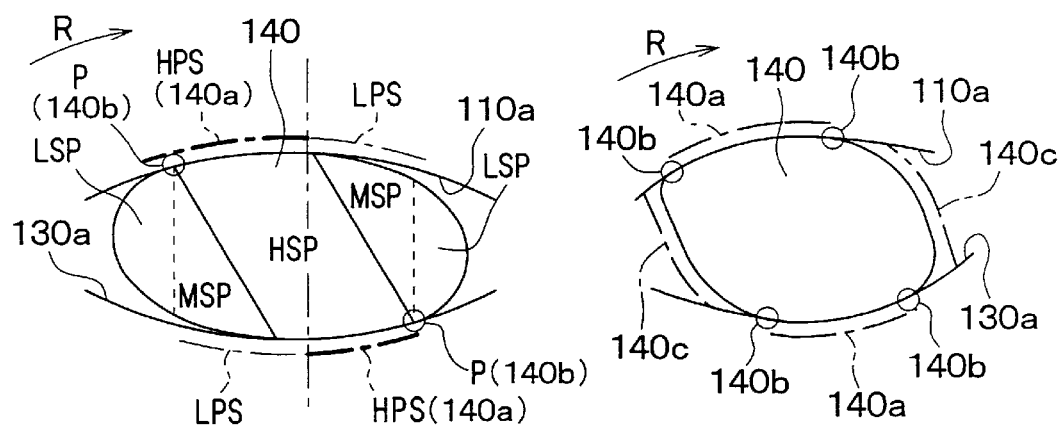
FIG. 5B is a schematic sectional view showing a damper used in the power transmission system in FIGS. 5A, and 5C is a schematic sectional view of a damper according to a comparison example.

In the third embodiment, the shapes of the damper 140, the inner concave 110b of the pulley 110, and the outer concave 130b of the inner hub 130 are changed, as compared with the above-described first embodiment, as shown FIGS. 5A and 5B. That is, in the third embodiment, the sectional shape of the cylinder-like damper 140 is changed, and the damper-arrangement space is also changed in accordance with the shape of the damper 140.

As shown in FIG. 5B, in the third embodiment, the damper 140 has surface parts 140a contacting the inner peripheral surface 110a and the outer peripheral surface 130a. Edge portions 140b of the surface parts 140a are curved so that a connection portion 140c connecting the one side edge portions 140b becomes substantially flat. That is, as shown in FIG. 5B, the connection portion 140c connecting both the one-side edge portions 140b is approximately straight line in cross-section.

In the above-described first embodiment, as shown in FIG. 5C, the inner concave 110b of the pulley 110, and the outer concave 130b of the inner hub 130 are respectively formed so that a rotation forward side of the damper-arrangement space is symmetrical with a rotation backward side thereof. However, in the third embodiment, the inner concave 110b and the outer concave 130b are respectively formed to have an asymmetrical arc shape in the rotation direction. That is, the radius of curvature on the rotation forward side of the arc shape of the inner concave 110b is smaller than that on the rotation backward side in the rotation direction R of the pulley 110. The line L1 shown in FIG. 5A is a line connecting an approximate center of the inner concave 110b and a center of curvature of the arc shape of the inner concave 110b in cross-section. As shown in FIG. 5A, the line L1 is toward the rotation forward side on the side of the center of curvature of the concave 110b.

On the other hand, the radius of curvature on the rotation forward side of the arc shape of the outer concave 130b is larger than that on the rotation backward side in the rotating direction R of the pulley 110. The line L2 shown in FIG. 5A is a line connecting an approximate center of the outer concave 130b and a center of curvature of the arc shape of the outer concave 130b in cross-section. As shown in FIG. 5A, the line L2 is toward the rotation backward side on the side of the center of curvature of the concave 130b.

In the above-described first embodiment, the cover 131a is molded integrally with the center hub 130. However, in the third embodiment, the cover 131a is molded separately from the center hub 130. In addition, plural protrusions 131b that are elastically deformable are formed on the outer periphery side of the cover 131a to be tightly engaged with an inner surface portion of the pulley 110, as shown in FIGS. 6A and 6B.

Next, advantages of the third embodiment will be now described. When torque acts on the damper 140 having an elliptic-sectional shape shown in FIG. 5C, the internal strain of the damper 140 is unevenly distributed. Therefore, at a boundary portion between a high strain part HSP and a low strain part LSP, a break may be readily caused in the damper 140. Specifically, as shown in FIG. 5C, the damper 140 having an elliptic sectional shape has a high strain part HSP corresponding to a contact surface contacting the inner concave 110a and the outer concave 130a, a middle strain part MSP, and a low strain part LSP. The high strain part HSP, the middle strain part MSP and the low strain part LSP are generated by a pressure different between a high pressure surface HPS corresponding to the surface part 140a in FIG. 5B and a low pressure surface LPS. Therefore, a large shearing stress is generated at a point P located at the boundary between the high strain part HSP and the low strain part LSP. The point P corresponds to an edge part 140b which is at an edge of the surface 140a in the rotation direction in FIG. 5B. Due to the large shearing stress at the small point P, a crack is readily generated from the point P in the damper 140.

However, in the third embodiment, as shown in FIG. 5B, the edge portions 140b of the surface parts 140a are curved so that the connection portion 140c connecting the edge portions 140b becomes substantially flat. That is, as shown in FIG. 5B, the connection portion 140c connecting both one-side edge portions 140b is approximately straight line in cross-section. Accordingly, lower strain parts are mostly eliminated, and the damper 140 becomes in a state mainly having the high strain parts. Thereby, the internal strain of the damper 140 is uniformly distributed. As a result, the crack due to the large shearing stress is prevented, and durability of the damper 140 is improved.

Figure 7:
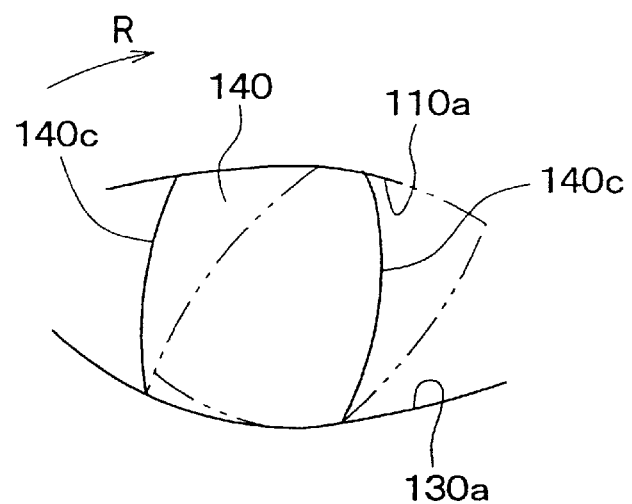
FIG. 7 is a schematic diagram of a referential damper for explaining an advantage of the damper according to the third embodiment.

In the third embodiment, the connection portion 140c is set so that a radial outside of the connection portion 140c is tilted to a rotation backward side by a predetermined angle θ relative to the radial direction of the pulley 110, as shown in FIG. 5A. Therefore, it can prevent the end part of the rotation backward side of the damper 140 from being separated from the outer concave 130b of the outer peripheral surface 130a, and it can prevent the stress generated in the damper 140 from being greatly increased in a small area. For example, if the connection portion 140c is approximately parallel to the radial direction as shown by solid lines in FIG. 7, the rotation backward side of the surface part 140a contacting the outer peripheral surface 130a is separated from the outer peripheral surface 130a when torque acts on the damper 140, as shown by broken lines in FIG. 7. In that case, stress is increased at the contact small area in the damper 140 because of contact area reduction. In third embodiment, it is possible to avoid local stress increase in the surface part 140a by the backward tilted angle θ of the radial outside of the connection portion 140c.

In the third embodiment, the inner concave 110b and the outer concave 130b are asymmetrically formed. Therefore, it is possible to enlarge a wall thickness between adjacent the damper-arrangement space without enlarging the pulley 110 and center hub 130. Besides, a distance Δ between the connection portion 140c and the inner concave 110b (the outer concave 130b) is made smaller, as shown in FIG. 5A. Therefore, the movement amount of the damper 140 is restricted even if a reverse torque acts on the damper 140 due to torque fluctuation. Thus, abrasion of the damper 140 is suppressed.

In the third embodiment, the plastic cover 131a is molded separately from the center hub 130, and the elastically-deformable protrusions 131b are formed on the outer periphery side of the cover 131a to be engaged with the inner peripheral side of the pulley 110. Therefore, the damper 140, the center hub 130, and the cover 131a are readily assembled. That is, in the assembling of the power transmission system, the damper 140 is assembled in the damper-arrangement space 110c after the center hub 130 is assembled, and then the cover 131 can be readily assembled.

Fourth Embodiment

A fourth embodiment of the present invention will be now described with reference to FIGS. 8A–8C. In the above-described first embodiment, the damper 140 is formed by a single material. However, in the fourth embodiment, the damper 140 is formed into a double-layer structure having an outer layer 141 and an inner layer 142 using different materials.

The outer layer 141 is made of a material having a sufficient abrasion resistance and having a rigid harder than the inner layer 142, such as EPDM (ethylene-propylene-diene ternary polymerization rubber)) and H-NBR (nitrile butadiene rubber). The inner layer 142 is made of a material having damping characteristic and extensibility, such as chlorinated butyl rubber and silicon rubber. Because the damper 140 has the double-layer structure, by suitably selecting the materials of the outer and inner layers 141, 142, the abrasion-resistance performance of the damper 140 can be improved while the torque-transmitting performance of the damper 140 is improved.

Figure 8C:
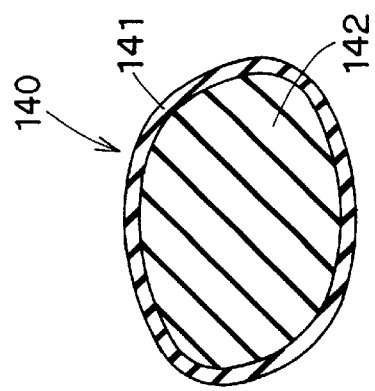
FIG. 8C is a schematic sectional view showing a damper used in the power transmission system in FIGS. 8A and 8B.
Figure 8B:
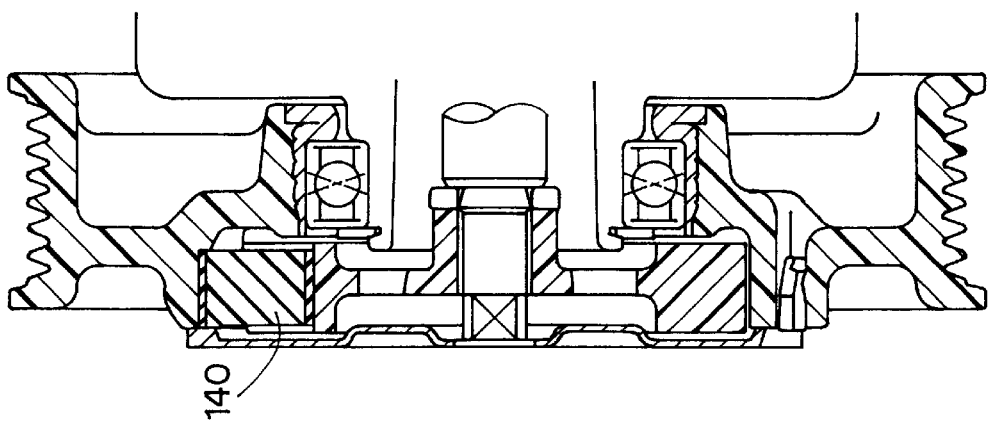
FIGS. 8A and 8B are a side view and a sectional view, respectively, showing a power transmission system according to a fourth embodiment of the present invention.
Figure 8A:
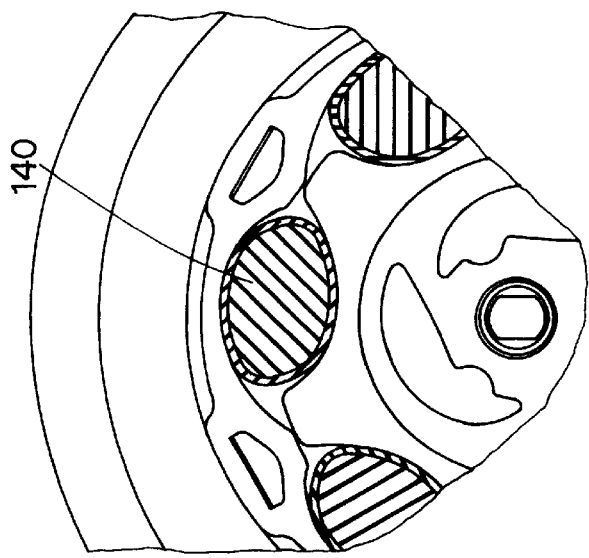

In addition, in the fourth embodiment, the damper 140 has a sectional shape as shown in FIGS. 8A and 8C, similar to that of the above-described third embodiment. Therefore, the advantage described in the above-described third embodiment can be obtained.

Although the present invention has been fully described in connection with the preferred embodiments thereof with reference to the accompanying drawings, it is to be noted that various changes and modifications will become apparent to those skilled in the art.

In the above-described third embodiment, the radial outside of the connection portion 140c is formed to be tilted to the rotation backward side by the predetermined angle θ relative to the radial direction. However, the connection portion 140c may be approximately parallel to this radial direction. That is, the predetermined angle θ may be approximately zero.

Figure 9A:
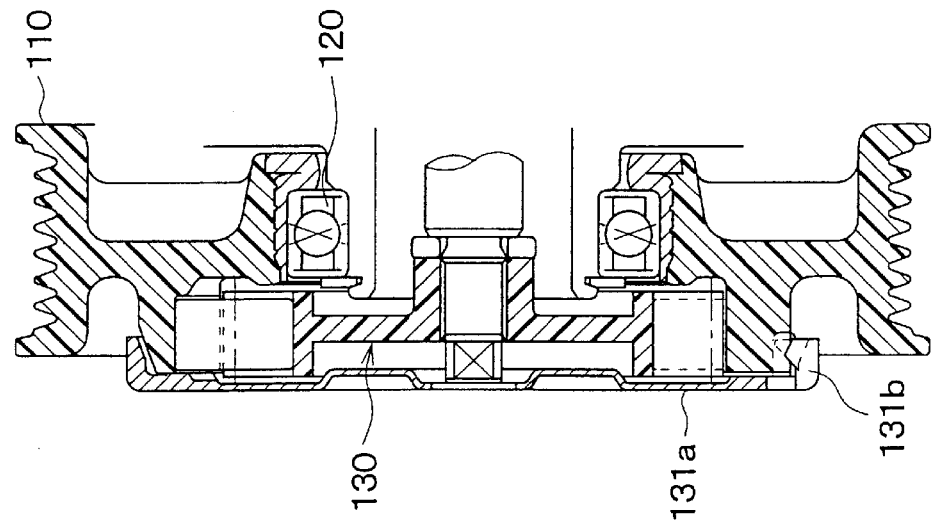
FIG. 9A is a side view showing a power transmission system according to a modification of the third embodiment of the present invention.
Figure 9B:
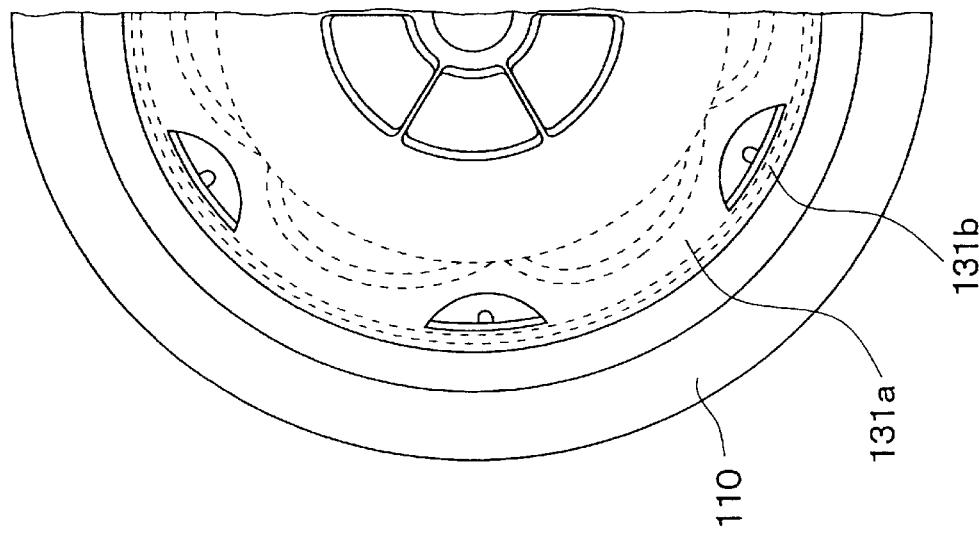
FIG. 9B is a cross-sectional view of the power transmission system shown in FIG. 9A.

In the above-described third embodiment, as shown in FIGS. 6A and 6B, the protrusions 131b of the cover 131a are disposed to be fitted into the inner peripheral surface of the pulley 110. However, the protrusions 131b of the cover 131a can be formed to be engaged with and fitted onto an outer peripheral surface of the pulley 110, as shown in FIGS. 9A and 9B.

In the above-described first embodiment, the center hub 130, which is the second rotating member connected to a driven unit, is coaxially disposed inside the pulley 110, which is the first rotating member driven by a power source. However, the radial positions of the center hub 130 and the pulley 110 may be set inversely.

In the above embodiments, the present invention is applied to a power transmission system transmitting the power generated by an engine to a compressor used in an air conditioning apparatus for a vehicle. However, the present invention is also applicable to other power transmission systems used in a fixed air conditioning apparatus or the like.

Such changes and modifications are to be understood as being within the scope of the present invention as defined by the appended claims.

What is claimed is:

1. A power transmission system for transmitting torque from a driving unit to a driven unit, the system comprising:
   a first rotating member which is rotated by the driving unit and has a first torque transmitting surface;
   a second rotating member connected to the driven unit, the second rotating member being disposed coaxially with the first rotating member and having a second torque transmitting surface disposed at a radial inner side of the first torque transmitting surface; and
   an elastically-deformable torque transmitting member which contacts the first and the second torque transmitting surfaces to transmit torque from the first rotating member to the second rotating member, wherein:
      the first and the second torque transmitting surfaces are arranged opposite to each other in a radial direction of the first and the second rotating members;
      the first torque transmitting surface has a plurality of first concaves arranged in a circumferential direction of the first torque transmitting surface, each of which is recessed toward a side opposite to the second torque transmitting surface;
      the second torque transmitting surface has a plurality of second concaves arranged in a circumferential direction of the second torque transmitting surface, each of the plurality of second concaves being directly opposite to each of the plurality of first concaves and recessed toward a side opposite to the first torque transmitting surface, and each of the plurality of first concaves and each of the plurality of second concaves has an asymmetrical arc shape in cross-section, where a radius of curvature of a rotation forward side is different from that of a rotation backward side; and the torque transmitting member includes a plurality of torque transmitting parts each of which is disposed between a pair of opposite first and second concaves.

2. The power transmission system according to claim 1, further comprising a first stopper provided in the first rotating member, is the first stopper being disposed to restrict the torque transmitting member from being displaced more than a predetermined distance to one side in an axial direction of the first and second rotating members.

3. The power transmission system according to claim 2, further comprising a second stopper provided in the second rotating member, the second stopper being disposed to restrict the torque transmitting member from being displaced more than a predetermined distance to another side in the axial direction.

4. The power transmission system according to claim 2, further comprising a second stopper engaged with the first rotating member to be fixed to the first rotating member, the second stopper being disposed to restrict the torque transmitting member from being displaced more than a predetermined distance to another side in the axial direction.

5. The power transmission system according to claim 1, further comprising:

a torque limiter provided in the second rotating member, which interrupts a torque transmission when torque transmitted to the driven unit exceeds a predetermined threshold value, the torque limiter further including a connection part connected to a rotating shaft of the driven unit, a rotating part that is rotated integrally with a member on which the second torque transmitting surface is provided, and a plurality of bridging parts connected between the rotating part and the connection part, each of the plurality of bridging parts for being broken when the torque transmitted to each bridging part exceeds the predetermined threshold value, wherein:

the torque transmitting member includes a plurality of transmitting parts arranged in a circumferential direction; and the number of the transmitting parts is set to be a natural-number times the number of the bridging parts.

6. The power transmission system according to claim 1, wherein:

the torque transmitting member is a double-layer structure having an outer layer and an inner layer inside the outer layer;

the outer layer is made of a material having a predetermined abrasion resistance and a rigidity higher than a rigidity of the inner layer; and the inner layer is made of a material having a predetermined damping characteristic and a predetermined extensibility.

7. The power transmission system according to claim 1, wherein the torque transmitting member has a cross-sectional shape such that strain generated when torque acts on the torque transmitting member is approximately uniformly distributed along an entire cross-section.

8. The power transmission system according to claim 1, wherein:

the torque transmitting member has a cross-sectional shape such that a connection portion connecting one side edge portions of contact surfaces of the torque transmitting member becomes an approximately straight line when contacting the first and second torque transmitting surfaces; and the one side edge portions form a curved surface.

9. The power transmission system according to claim 8, wherein a radial outer side of the connection portion is tilted toward a rotation backward side relative to a radial direction of the first and second rotating members, when torque is not applied to the torque transmitting member.

10. The power transmission system according to claim 1, wherein each torque transmitting part has an elliptical cross-sectional shape corresponding to the asymmetrical arc shape of the pair of opposite first and second concaves.

* * * * *